United States Patent [19]
Streit et al.

[11] Patent Number: 5,822,978
[45] Date of Patent: Oct. 20, 1998

[54] METHOD OF CONTROLLING THE ELECTRIC HEATING OF A CATALYTIC CONVERTER

[75] Inventors: Walter Streit, Ingolstadt; Rainer Mertl, Garching; Erhard Otto, Grobenzell; Achim Donnerstag, Braunschweig; Kurt Maute, Sindelfingen; Alfred Wirth, Oberdischingen; Wolfgang Zag, Flacht, all of Germany

[73] Assignee: Audi AG, Ingolstadt, Germany

[21] Appl. No.: 750,881

[22] PCT Filed: Jun. 21, 1995

[86] PCT No.: PCT/EP95/02412

§ 371 Date: Dec. 18, 1996

§ 102(e) Date: Dec. 18, 1996

[87] PCT Pub. No.: WO96/00343

PCT Pub. Date: Jan. 4, 1996

[30] Foreign Application Priority Data

Jun. 24, 1994 [DE] Germany ............ 44 22 198.3

[51] Int. Cl.[6] .................. F01N 3/20; F01N 9/00; B60R 16/04
[52] U.S. Cl. ................. 60/274; 60/286; 60/300; 219/202; 219/519; 307/10.7
[58] Field of Search .............. 60/274, 284, 286, 60/300, 303; 307/10.7; 320/152; 219/202, 203, 519; 422/173, 174, 198, 199

[56] References Cited

U.S. PATENT DOCUMENTS

| | | | |
|---|---|---|---|
| 4,082,992 | 4/1978 | Day | 320/117 |
| 4,990,885 | 2/1991 | Irick | 340/455 |
| 5,107,094 | 4/1992 | Kuhn et al. | 219/202 |
| 5,525,891 | 6/1996 | Meyer et al. | 320/128 |

FOREIGN PATENT DOCUMENTS

| | | |
|---|---|---|
| 0500287 | 8/1992 | European Pat. Off. . |
| 3939068 | 5/1991 | Germany . |
| 4028242 | 3/1992 | Germany . |
| 4223854 | 1/1993 | Germany . |
| 4326384 | 2/1994 | Germany . |
| 9214631 | 9/1992 | WIPO . |

OTHER PUBLICATIONS

Patent Abstracts of Japan, vol. 18, No. 279, May 27, 1994, abstract of JP, A,06 050138 (Nissan Motor Co. Ltd), Feb. 22, 1994.

Primary Examiner—Tony M. Argenbright
Attorney, Agent, or Firm—Lalos & Keegan

[57] ABSTRACT

This is a method of controlling an electric heater of a catalytic converter. An electric heater is powered by two separate batteries. There are an electronic control unit, a power switch, and an isolating switch providing logic control to the electric heater.

9 Claims, 2 Drawing Sheets

METHOD OF CONTROLLING THE ELECTRIC HEATING OF A CATALYTIC CONVERTER

BACKGROUND OF THE INVENTION

The invention relates to a process for controlling the electric heating system of a catalytic converter for detoxification of the exhaust gases of an internal combustion engine in a motor vehicle.

Since internal combustion engines emit an especially high volume of exhaust gases during a cold start and the catalytic converter does not ensure adequate conversion of the exhaust gas component until a certain high-off temperature is reached, prompt readiness of the converter for operation in future exhaust gas cleaning systems assumes special importance. It must be ensured that electric heating systems will actually perform the function assigned to them over the period of operation.

OBJECT OF THE INVENTION

Hence the object of the invention is to develop a process for controlling the electric heating system of a catalytic converter whereby proper operation in a motor vehicle can be constantly monitored.

It is thus claimed for the invention that the vehicle electrical system voltage is monitored, if desired over a conventional voltage monitoring circuit, with the "heater on" requirement met, and then, with the on-off switch in the "off" position, the voltage of the filament battery is monitored and, if the values are below the assigned minimum values—and so no longer guarantee adequate heating of the catalytic converter—the heater is switched off and an error signal is generated, and if desired the error is entered in addressable error storage. This permits constant monitoring of the converter heating system in a motor vehicle; an error signal, preferably a warning light, can alert the operator to the need for taking appropriate steps when the heating system is not working properly. It can be determined, at a service station, for example, if the batteries or the heating elements are not functioning as they should.

In addition, preferably the voltage behavior during heating can be monitored; this behavior as well may indicate abnormal operation and provide the basis for prompt elimination of the abnormality in operation. For example, in the case of normally operating heating elements a power surge based on high current absorption by the heating elements must occur in properly operating heating elements when the power switch is engaged. If this power surge does not occur, it may be inferred that these heating elements are defective or line breakage has occurred. On the other hand, if the voltage of the filament battery drops over time in too steep a gradient after the power switch is closed, such behavior suggests a battery in poor condition or corroded line contacts.

When the filament battery is reconnected to the vehicle's electrical system after the converter has been heated, it is necessary to make certain that there is no excessively sharp voltage drop which may impair the operation of other power consuming devices, especially safety-relevant system controls.

Since the filament battery must be recharged as quickly as possible after the converter is heated, it is proposed, that the charging current be controlled and monitored as a booster charge.

An embodiment of the invention is explained in what follows with reference to additional details. In the schematic drawing.

DESCRIPTION OF THE PREFERRED EMBODIMENT

Figure 1:
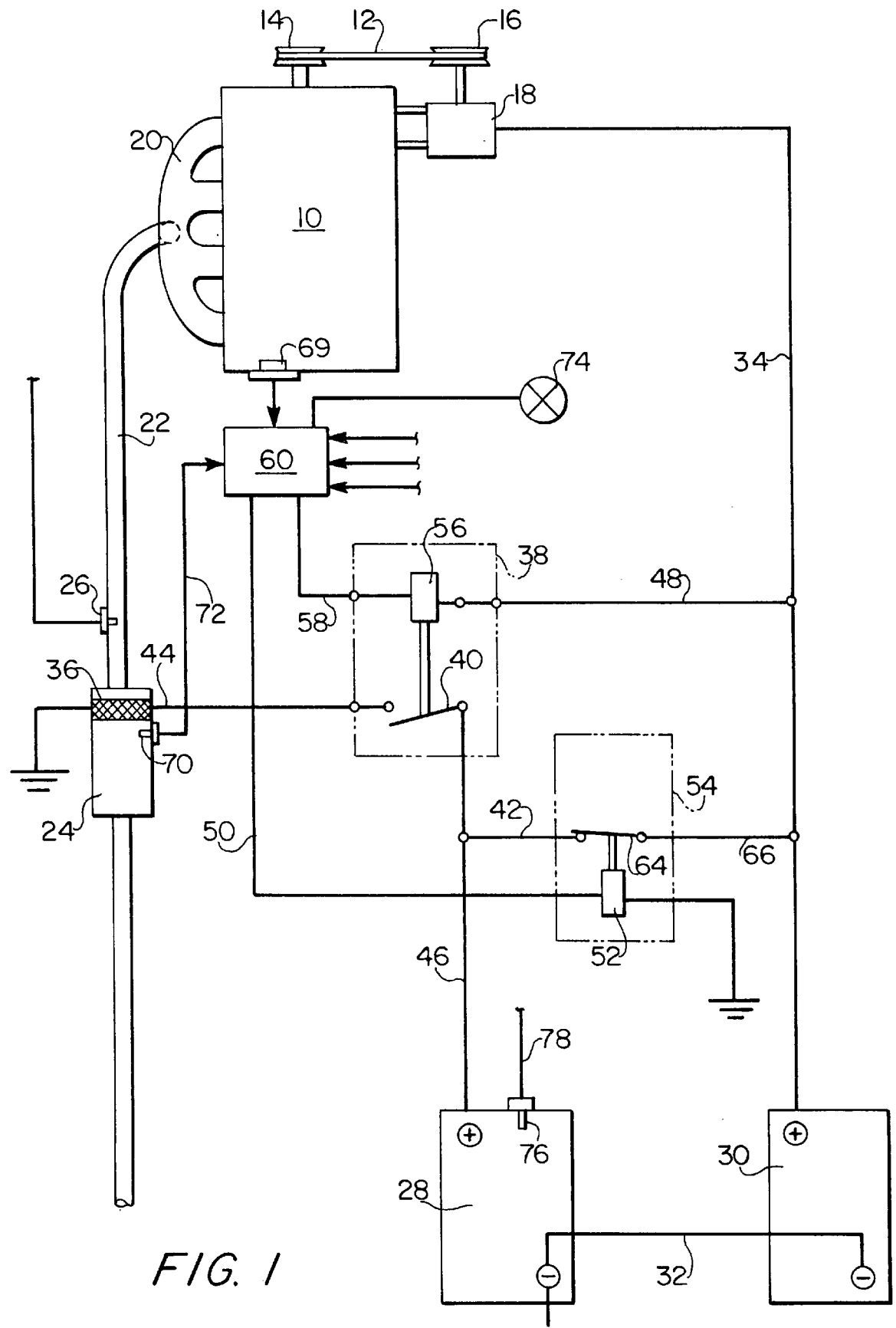
FIG. 1 shows a device for electric heating of a catalytic converter in an exhaust gas system of an internal combustion engine in a motor vehicle.

In FIG. 1, 10 designates an internal combustion engine which by a state-of-the-art design drives an electric generator 18 by way of a drive belt 12 and corresponding drive pulleys 14, 16. The exhaust gas emitted is guided to a three-way catalytic converter 24 by way of an exhaust gas manifold 20 and an exhaust gas intake pipe 22 and then released into the atmosphere by a method not shown. There is provided in the exhaust gas intake pipe a lambda probe 26 which by a state-of-the-art method controls the fuel metering device of the internal combustion engine so that a virtually stoichiometric fuel-air ratio is maintained.

The vehicle electrical system of the motor vehicle, only part of which is shown, has two batteries 28, 30 as current storage devices whose negative poles are connected to each other by a line 32. The positive pole of one battery, 30, is connected to the vehicle electrical system by a line 34, including the power output of the generator 18.

The catalytic converter 24 is outfitted with an electric heater 36, which may consist of a plurality of glow plugs projecting into the converter. The heater 36 is connected on one side to a negative potential, while its positive input is connected to a power switch 38. The power switch 38 is designed as a normally open relay with an operating contact 40, this operating contact being connected by a line 44 to the heater 36 and by a line 46 to the filament battery 28. The control winding 56 of the power switch 38 is connected on the positive side by a line 48 to the line 34 of the vehicle electrical system and on the negative side by a line 58 to an electronic control unit 60.

In addition, there is provided between the two batteries 28, 30 an isolating switch 54 which, being designed as a break contact with an operating contact 64, can isolate the two batteries 28, 30 electrically from each other, the operating contact 64 interrupting lines 42, 66 provided on the positive side between the two batteries. The control winding 52 of the isolating switch 54 is permanently connected on one side to the negative potential and on the positive side is connected by a line 50 to the electronic control unit 60.

The electronic control unit 60, which controls the control windings 52, 56 of the power switch 38 and the isolating switch 54, has several inputs through which the temperature of the internal combustion engine 10 is received by way of a temperature probe 69, the external temperature by way of another temperature probe (not shown), and, lastly, the temperature of the catalytic converter by way of a temperature probe 70 and a line 72. In addition, connections (not shown) are provided by way of which the voltage of the vehicle electrical system can be received (e.g., by connection to line 34) and the voltage of the filament battery 28 may be received (e.g., through a connection to line 46).

A warning light 74 indicating irregular heating of the converter 24 and provided on the dashboard (not shown) of the motor vehicle may be lit by the electronic control unit 60.

Figure 2:
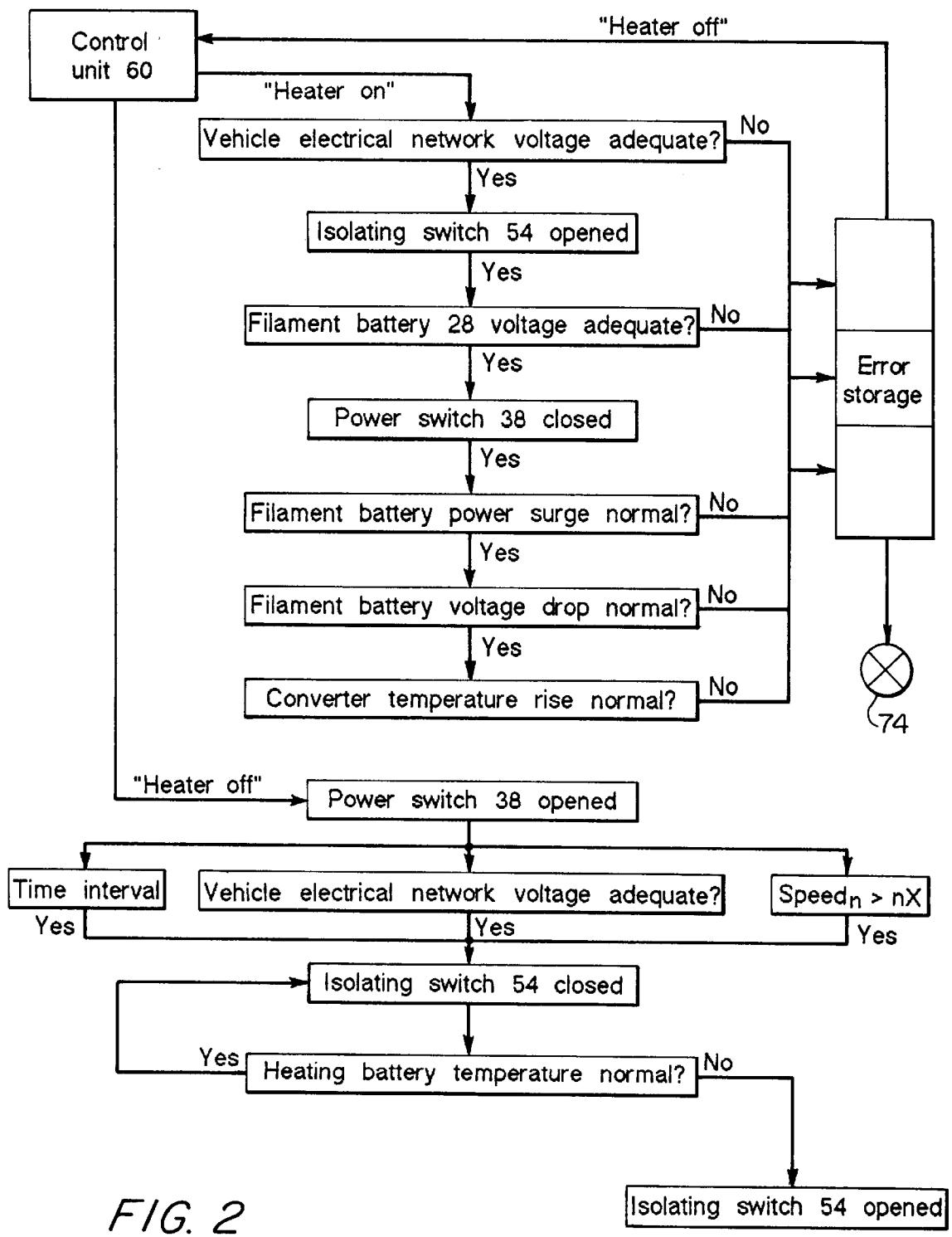
FIG. 2 shows a flow chart of the process steps integrated into the system control unit.

When the internal combustion engine 10 is cold-started, the command "heater on" is first sent by way of the engine control unit to the electronic control unit 60 (see FIG. 2, flow chart). The following processes are thereby initiated in the control unit 60 by appropriate electronic switching operations:

First of all, the voltage of the vehicle electrical system of the motor vehicle is checked by way of a voltage detection circuit (not shown) and, if this voltage is below a specific minimum value, an error message is generated on the basis of which the warning light 74 is lit. In addition, the error is stored in readable error storage integrated into the control unit 60 and, lastly, the process in the control unit, that is, the heater, is switched "off."

If the voltage of the vehicle electrical system suffices, the isolating switch 54 is opened, so that the battery 28 is electrically isolated from the electrical system of the motor vehicle. When the isolating switch, whose operation may be scanned if desired by way of a safety contact, is open, the voltage of the filament battery is now checked by way of the integrated voltage measurement circuit and, if this voltage is below a specific minimum value, an error signal is also generated, the error storage is accordingly activated, and the heating is again set to "off."

If the voltage of the filament battery 28 is also sufficient, the power switch 38 is now closed by appropriate triggering of the relays 40, 56 and the heating is switched on. A check is made in this process in the electronic control unit 60 by way of the voltage measurement circuit to determine if a brief power surge occurs with the power switch 38 closed and if the voltage drop occurring when the heating is initiated follows a prescribed characteristic curve. The power surge and the voltage drop corresponding to regular heating over time may be determined empirically and established so that system errors may be detected on the basis of values differing from these values as determined.

In addition, when the heater 36 of the catalytic converter 24 is initiated, temperature monitoring in the electronic control unit 60 is triggered by way of the temperature sensor 70, the converter temperature over time being detected and compared to temperature values which are entered as a function of the external temperature or, if desired, are determined empirically. If the normal temperature values are not reached over the time interval covered, malfunctioning of the converter heating system may also be assumed. Such malfunctions are also stored in the error storage, and at the same time the warning lamp 74 is lit.

After adequate normal heating of the catalytic converter 24, with the heating time optionally assigned by the control unit (not shown) of the internal combustion engine, the control unit 60 receives the command "heating off," as a result of which this control unit first reopens the power switch 38.

A check is then made, preferably in an AND circuit, to determine if the vehicle electrical system voltage is high enough, if the speed of the internal combustion engine is greater than an assigned minimum speed value, and if a specific time interval has passed since disconnection of the heater 36. If these three criteria are met, the isolating switch 54 is closed again, and as a result the filament battery 28 is reconnected to the electrical system of the motor vehicle.

When the isolating switch 54 is closed, the process of charging the battery 28 takes place, primarily by way of the generator 18. The temperature of the filament battery 28 is monitored in the process by a temperature sensor 76, which is connected by a line 78 to the electronic control unit 60. If rise in the temperature of the filament battery 28 is impermissibly high, the isolating switch 54 is reopened by the control unit 60 or the charging current is interrupted.

In place of the on-off isolating switch 54 shown there may also be provided an electronic switch which permits control of the charging current in accordance with the known criteria for fast charging. It is nevertheless obvious that in a specific design the power switch 38 and the isolating switch 54 may be integrated into the electronic control unit 60 in order to avoid the cabling cost otherwise involved.

We claim:

1. A process of controlling an electric heater of a catalytic converter for detoxification of exhaust gases of an internal combustion engine in a motor vehicle, comprising the steps of:

connecting a first battery and a second battery with an electrical system of the motor vehicle, the first battery being connectable to a power switch and the electric heater through an electric control unit based on a function of one of temperature and charging level, the first battery being electrically isolatable from the second battery and the electrical system of the motor vehicle through an isolating switch;

detecting a filament battery voltage of the first battery when a heater on criterion is satisfied, a vehicle electrical system voltage is detected, and the isolating switch is set in an open state; and generating an error signal when the electric heater is switched to an off state when the filament battery voltage falls below an assigned minimum value.

2. A process as claimed in claim 1, switching the heater to an off state and generating at least one of an error signal and no error signal at all when the power switch is closed upon the conditions that the filament battery voltage value is sufficiently high, a pattern of the voltage value is monitored, and the filament battery voltage value remains the same.

3. A process as claimed in claim 1, monitoring the filament battery voltage during a heating stage of the catalytic converter and the electric heater is switched to an off state; and generating at least one of the error signal and no error signal at all when the filament battery voltage value is below a minimum value.

4. A process as claimed in claim 1, closing the isolating switch as a function of one of the vehicle electrical system voltage, a speed of the internal combustion engine, a temperature of the internal combustion engine and a predetermined period of time after closing and reopening of the power switch.

5. A process as claimed in claim 1, wherein the first battery is charged with a controlled charging current.

6. A process as claimed in claim 5, optimizing the charging current as a function of at least one of the filament battery voltage and the temperature of the filament battery, on the basis of a characteristic diagram.

7. A process as claimed in claim 5, wherein the isolating switch is in the form of a variable resistor for controlling the charging current.

8. A process as claimed in claim 1, providing at least one of the error signals and switching the heater to an off state when the temperature of the catalytic converter is monitored over time by at least one temperature sensor and in the event of deviation from an assigned temperature value.

9. A process as claimed in claim 1, storing at least one of all error signals in an addressable error storage and optically displaying the error signals.

* * * * *

UNITED STATES PATENT AND TRADEMARK OFFICE
CERTIFICATE OF CORRECTION

PATENT NO.   : 5,822,978
DATED        : October 20, 1998
INVENTOR(S)  : Walter Streit, Rainer Mertl, Erhardt Otto, Achim Donnerstag, Kurt Maute, Alfred Wirth, Wolfgang Zag It is certified that error appears in the above-identified patent and that said Letters Patent is hereby corrected as shown below:

On the title page:
Under heading [73] Assignee, it should read

Audi AG, Ingolstadt, Germany;
Bayerische Motoren Werke AG, Munich, Germany;
Mercedes-Benz AG, Stuttgart, Germany;
Dr. Ing.h.c.F. Porsche AG, Stuttgart, Germany; and
Volkswagen AG, Wolfsburg, Germany Signed and Sealed this Twenty-fourth Day of August, 1999

Attest:

Q. TODD DICKINSON

*Attesting Officer*      *Acting Commissioner of Patents and Trademarks*